March 25, 1947. W. G. PRENTICE 2,417,946
TOOL HANDLE
Filed Aug. 14, 1944
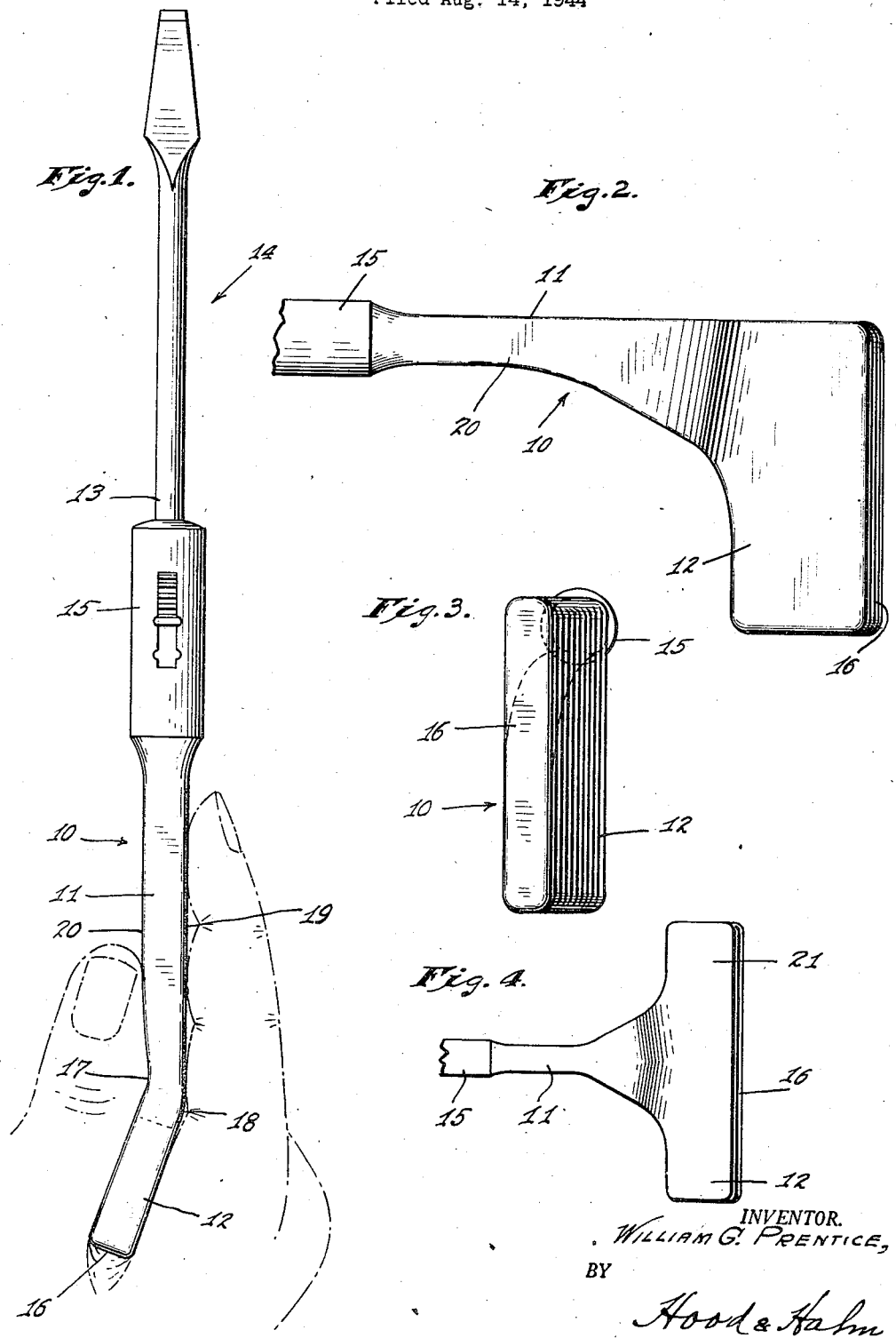
INVENTOR.
WILLIAM G. PRENTICE,
BY
Hood & Hahn
ATTORNEYS.

Patented Mar. 25, 1947

2,417,946

UNITED STATES PATENT OFFICE 2,417,946

TOOL HANDLE

William G. Prentice, Indianapolis, Ind.

Application August 14, 1944, Serial No. 549,399

2 Claims. (Cl. 145—61)

The present invention relates to a tool handle, and particularly to a handle of novel construction primarily intended for association with a tool of the type which is to be twisted or rotated about its longitudinal axis by the manual force of the manipulator. The primary object of the invention is to provide a handle for such a tool which will accommodate itself to the manipulator's hand in such a fashion as to permit the exertion of a maximum turning force upon the tool, together with an axial force, while providing for maximum comfort and natural posture of the hand of the operator, including the fingers thereof.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a top plan view of my tool handle associated with a ratchet screw driver;

Fig. 2 is a side elevation of such handle;

Fig. 3 is an end elevation thereof taken from the right of Fig. 2; and

Fig. 4 is a reduced view similar to Fig. 2 and showing a modified form of my tool adapted to left-hand as well as right-hand use.

Referring more particularly to the drawings, it will be seen that the tool handle, indicated generally by the reference numeral 10, comprises a shank portion 11 and a grip portion 12. The shank portion 11 is adapted to be coaxially associated with the shank 13 of a tool, indicated generally by the reference numeral 14. In the illustrated embodiment of the invention, the tool 14 is a screw driver having a ratchet barrel 15 of well understood construction; and the handle shank 11 is suitably associated with the rear end of the barrel 15.

The grip portion 12 of the handle is substantially rectangular in general configuration, and its major dimension projects perpendicularly downwardly from the shank 11, as viewed in Fig. 2. Said grip portion is adapted to lie in the palm of the manipulator's hand with the little finger and the next two adjacent fingers of the hand enwrapped about the lower projection of the grip, and with the rear edge 16 of the grip substantially aligned with the so-called "head line" of the palm.

As is most clearly shown in Figs. 1 and 3, the grip portion 12 is turned laterally out of the axial line of the shank portion 11. Thereby the handle is provided with a concavity 17 for the accommodation of the ball of the manipulator's thumb, and with a corresponding convexity 18 which is adapted to be received in the fold at the base of the proximal phalange of the manipulator's forefinger. Thus, when the handle is so gripped, the forefinger of the manipulator will lie, in a relaxed position, along the lateral surface 19 of the shank 11, while the thumb will lie, in an equally natural position, along the opposite surface 20 of the handle shank.

The natural position assumed by the hand, while holding the handle of the present invention greatly facilitates the application of axial pressure to the tool during the application of rotational force thereto. It also increases the degree of rotational force which can be exerted by the hand, as compared with attempts to manipulate a similar tool through a substantially cylindrical handle coaxial with the tool shank.

Of course, the tool handle thus far described is adapted for use only by right-handed operators, since the grip portion 12 must depend below the shank portion 11 to lie within the operator's palm, and since, when the grip portion assumes a pendant position, the convexity 17 is located on its left-hand side, as viewed when facing in the direction of the projection of the tool 14. Obviously, the handle can be modified to adapt it for use by left-handed workers, by building it with the inclination or off-set of the portion 12 directed toward the right instead of toward the left, as viewed in Figs. 1 and 3.

But such an expedient will obviously require a duplication of manufacturing jigs or dies, and will also materially increase the amount of stock which must be carried by dealers in my tool handles. Therefore, I prefer the construction illustrated in Fig. 4 in which the handle is shown to have a T-head as distinguished from the L-head of Figs. 1–3.

The projection 21 is a mere continuation of the projection 12, and is in all respects identical with the grip portion 12. When the tool handle is in use by a right-handed worker, the portion 12 operates in exactly the manner above described, while the portion 21 merely projects upwardly above the worker's hand. If, however, the tool is to be used by a left-handed worker, he will invert the tool handle about its axis to bring the portion 21 into a pendant position. Now, when the tool is viewed from above, as in Fig. 1, the inclination of the grip portion will be seen to be toward the right, so that the ball of the operator's left thumb will lie naturally in the concavity 17.

I claim as my invention:
1. A handle for a tool adapted to be twisted about its own axis, said handle comprising a shank portion and a grip portion, said grip portion being adapted to lie in the palm of the manipulator's hand and having an extent, in one direction, substantially perpendicular to the axis of said shank portion sufficient to accommodate the little finger and the next two adjacent fingers of the manipulator's hand in enwrapping relation to said grip portion, said shank portion being substantially coaxial with said tool, and said grip portion lying in a plane angularly related to said shank portion so that, when said grip portion is so held, the manipulator's forefinger will lie naturally along the outer surface of the angle between said shank portion and said grip portion while his thumb will lie along the inner surface of said angle.

2. The tool handle of claim 1 in which said grip portion extends substantially equally in opposite directions from said axis, whereby, when the tool handle is held in one position, the forefinger and thumb of the manipulator's right hand will lie in the described positions, whereas, when the tool handle is turned through 180 degrees about the axis of its shank portion, the forefinger and thumb of the manipulator's left hand will lie in the described positions.

WILLIAM G. PRENTICE.

REFERENCES CITED

The following references are of record in the file of this patent:

UNITED STATES PATENTS

| Number | Name | Date |
| --- | --- | --- |
| 1,020,141 | Gordon | Mar. 12, 1912 |
| 1,980,087 | Rast | Nov. 6, 1934 |
| D. 107,007 | Cashmore | Nov. 16, 1937 |

FOREIGN PATENTS

| Number | Country | Date |
| --- | --- | --- |
| 162,783 | British | May 4, 1921 |
| 73,402 | Swiss | Oct. 2, 1916 |

OTHER REFERENCES

"American Machinist," vol. 58 #3, page 129, Jan. 18, 1923, 145/61.